(12) United States Patent
Mizobata et al.

(10) Patent No.: US 10,625,363 B2
(45) Date of Patent: Apr. 21, 2020

(54) DIFFERENT MATERIAL WELDED JOINT AND WELDING METHOD

(71) Applicant: TOYOTA BOSHOKU KABUSHIKI KAISHA, Aichi-ken (JP)

(72) Inventors: Hiroshi Mizobata, Aichi-ken (JP); Fumitoshi Akaike, Aichi-ken (JP); Tsuyoshi Hattori, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 364 days.

(21) Appl. No.: 15/283,754

(22) Filed: Oct. 3, 2016

(65) Prior Publication Data

US 2017/0095876 A1 Apr. 6, 2017

(30) Foreign Application Priority Data

Oct. 5, 2015 (JP) ................. 2015-197680

(51) Int. Cl.
*B23K 9/23* (2006.01)
*B23K 9/09* (2006.01)
*B23K 9/173* (2006.01)
*B23K 9/235* (2006.01)
*B23K 33/00* (2006.01)
*F16B 5/08* (2006.01)
*B23K 103/20* (2006.01)

(52) U.S. Cl.
CPC ............... *B23K 9/232* (2013.01); *B23K 9/09* (2013.01); *B23K 9/173* (2013.01); *B23K 9/235* (2013.01); *B23K 33/008* (2013.01); *F16B 5/08* (2013.01); *B23K 2103/20* (2018.08)

(58) Field of Classification Search
CPC .......... B23K 9/232; B23K 9/09; B23K 9/173; B23K 9/235; B23K 33/008; B23K 2103/20; F16B 5/08; F16L 35/08
USPC ......... 219/130.21, 118, 633, 130.5; 228/165, 228/262.4, 262.5, 192, 225
See application file for complete search history.

(56) References Cited

FOREIGN PATENT DOCUMENTS

| JP | AS51-101744 | 9/1976 |
| JP | AS53-106351 | 9/1978 |
| JP | AH05-104246 | 4/1993 |
| JP | 2008221322 A * | 9/2008 |

(Continued)

OTHER PUBLICATIONS

Japanese Office Action in counterpart Japanese application No. 2015-197680, dated Mar. 5, 2019 (along with English-language translation).

(Continued)

*Primary Examiner* — Dana Ross
*Assistant Examiner* — Joseph M Baillargeon
(74) *Attorney, Agent, or Firm* — Greenblum & Bernstein, P.L.C.

(57) ABSTRACT

A different material welded joint in which a first member made of a first material and a second member made of a second material having a melting point lower than that of the first material are joined to each other by welded parts, wherein the first member has a plurality of through-holes and a filler material made of the second material is filled in the plurality of through-holes, and wherein an interval between the through-holes is made wider and/or an area of the through-hole is made smaller at a welding end-side than at a welding start-side with respect to progress of welding.

6 Claims, 8 Drawing Sheets

(56) References Cited

FOREIGN PATENT DOCUMENTS

| JP | A2008-221322 | 9/2008 |
|----|--------------|--------|
| JP | A2009-154206 | 7/2009 |
| JP | 4438691      | 3/2010 |
| JP | A2011-125899 | 6/2011 |

OTHER PUBLICATIONS

U.S. Appl. No. 15/283,733 to Hiroshi Mizobata et al., filed Oct. 3, 2016.

* cited by examiner

DIFFERENT MATERIAL WELDED JOINT AND WELDING METHOD

CROSS-REFERENCE TO RELATED APPLICATIONS

This application claims priority from Japanese Patent Application No. 2015-197680 filed on Oct. 5, 2015, the entire contents of which are incorporated herein by reference.

TECHNICAL FIELD

The disclosure relates to a different material welded joint and a welding method between materials having different melting points such as an iron-based material and an aluminum-based material to be used for a vehicle such as an automobile, an airplane, a ship, an electric train and the like or for a mechanical component, an architecture building and the like.

BACKGROUND

A different material welded joint and a welding method for joining an iron-based material (hereinafter, simply referred to as steel material) and an aluminum-based material (a collective term of pure aluminum and aluminum alloy, and hereinafter simply also referred to as aluminum material) having different melting points are disclosed in JP-B-4,438,691. This technology is to form a plurality of through-holes in the steel material at a joining place between the steel material and the aluminum material and to fill a filler material of the aluminum-based material in the through-holes, thereby performing welding. According to this technology, the filler material of the aluminum-based material is welded to the aluminum material serving as a matrix, and the filler material flooded onto a surface of the steel material from the through-holes upon the welding is cooled and then becomes welding beads, which are covered onto the steel material in the vicinity of the through-holes. Thereby, the steel material and the aluminum material, which are different materials, are joined.

However, according to the above technology of the related art, as the welding is progressed, an amount of input heat to a welded part increases, so that a melted amount of the filler material increases as the welding is progressed. In an extreme case, the aluminum material serving as a matrix may also be melted. That is, non-uniformity of a welding quality is caused between a welding start-side region and a welding end-side region. The reason is as follows: since the welding is continuously performed so that a welding line passes through respective central liens of the plurality of through-holes, in the above technology of the related art, welding heat is accumulated in the steel material and the aluminum material as the welding is progressed.

SUMMARY

The disclosure has been made in view of the above situations, and an object of the disclosure is to provide a technology of welding and joining a first member made of a first material and a second member made of a second material having a melting point lower than that of the first material by forming a plurality of through-holes in the first material at a plurality of welding sections at which the first member and the second member are to be welded, and filling a filler material made of the second material in the plurality of through-holes, in which a heat capacity of the first member is increased to suppress an increase in temperature of the first member due to heat, which is to be generated in association with the welding, thereby suppressing non-uniformity of a welding quality between a welding start-side region and a welding end-side region.

According to an aspect of the disclosure, there is provided a different material welded joint in which a first member made of a first material and a second member made of a second material having a melting point lower than that of the first material are joined to each other by welded parts, wherein the first member has a plurality of through-holes and a filler material made of the second material is filled in the plurality of through-holes, and wherein an interval between the through-holes is made wider and/or an area of the through-hole is made smaller at a welding end-side than at a welding start-side with respect to progress of welding.

According to another aspect of the disclosure, there is provided a welding method including: welding and joining a first member made of a first material and a second member made of a second material having a melting point lower than that of the first material by forming a plurality of through-holes in the first member at a plurality of welding sections at which the first member and the second member are to be welded, and filling a filler material made of the second material in the plurality of through-holes, wherein an interval between the through-holes is made wider and/or an area of the through-hole is made smaller at a welding end-side than at a welding start-side with respect to progress of welding.

DETAILED DESCRIPTION

Figure 1:
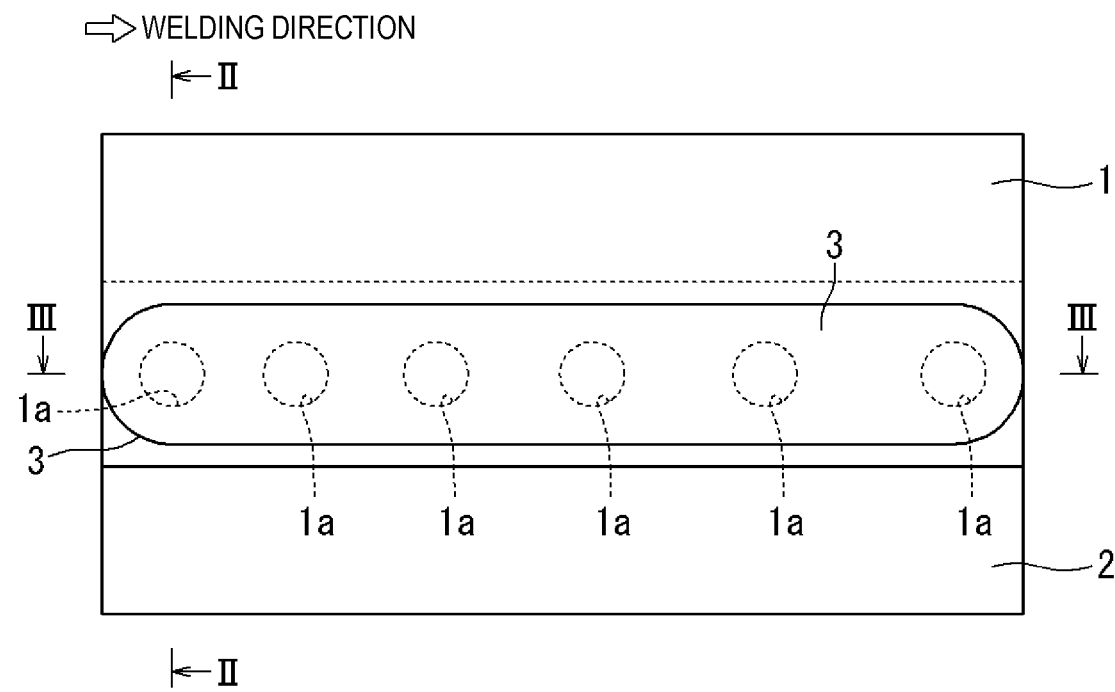
FIG. 1 is a plan view depicting a first illustrative embodiment of a different material welded joint and a welding method of the disclosure.
Figure 4:
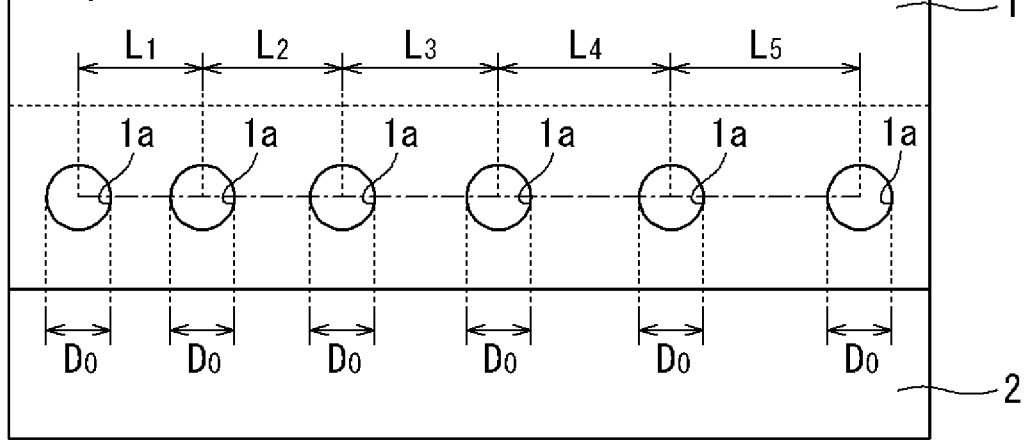
FIG. 4 is a plan view depicting a state where a steel material and an aluminum material are overlapped in the first illustrative embodiment.
Figure 5:
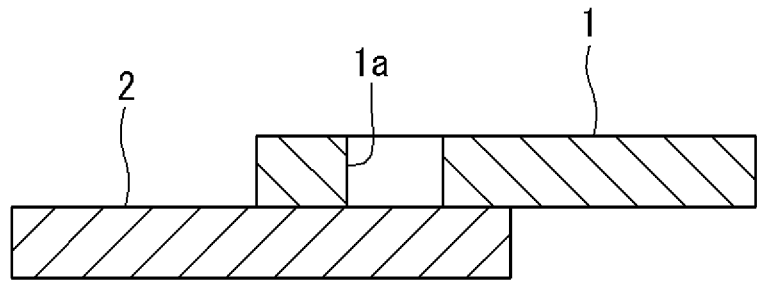
FIG. 5 is a sectional view taken along a line V-V of FIG. 4.

FIG. 1 depicts a first illustrative embodiment of the disclosure. The first illustrative embodiment relates to a different material welded joint configured by welding a flat plate-shaped steel material 1 and a flat plate-shaped aluminum material 2, and a welding method thereof. Before performing the welding, the steel material 1 and the aluminum material 2 are overlapped at joining parts, as shown in FIGS. 4 and 5, and the steel material 1 is formed with a plurality of (six, herein) through-holes 1a at the overlapping part. Therefore, at this state, portions of the aluminum material 2 corresponding to the through-holes 1a are exposed to an outside through the through-holes 1a. Herein, the through-holes 1a are respectively formed along one straight line. In the meantime, the number, sizes, shapes, arrangement method and the like of the through-holes 1a can be appropriately changed. Also, the steel material 1 includes common steel, high-tensile steel, and the like, and the aluminum material 2 includes a pure aluminum-based material, an aluminum alloy-based material, and the like. The steel material 1 is an example of the first member of the disclosure, and the aluminum material 2 is an example of the second member of the disclosure.

As shown in FIG. 4, an interval between the through-holes 1a is made wider at a welding end-side than at a welding start-side with respect to progress of the welding. That is, the intervals between the through-holes 1a are gradually increased from the through-hole 1a of the left end of FIG. 4, which is a welding start point, toward the right side. In FIG. 4, a distance from the through-hole 1a of the left end of FIG. 4 to the second through-hole 1a from the left is L1, a distance from the second through-hole 1a from the left to the third through-hole 1a from the left is L2, a distance from the third through-hole 1a from the left to the fourth through-hole 1a from the left is L3, a distance from the fourth through-hole 1a from the left to the fifth through-hole 1a from the left is L4, and a distance from the fifth through-hole 1a from the left to the sixth through-hole 1a from the left is L5. The sizes of the respective distances are set to be L1<L2<L3<L4<L5. Herein, the respective through-holes 1a are circles having the same size and a diameter D0.

Figure 8:
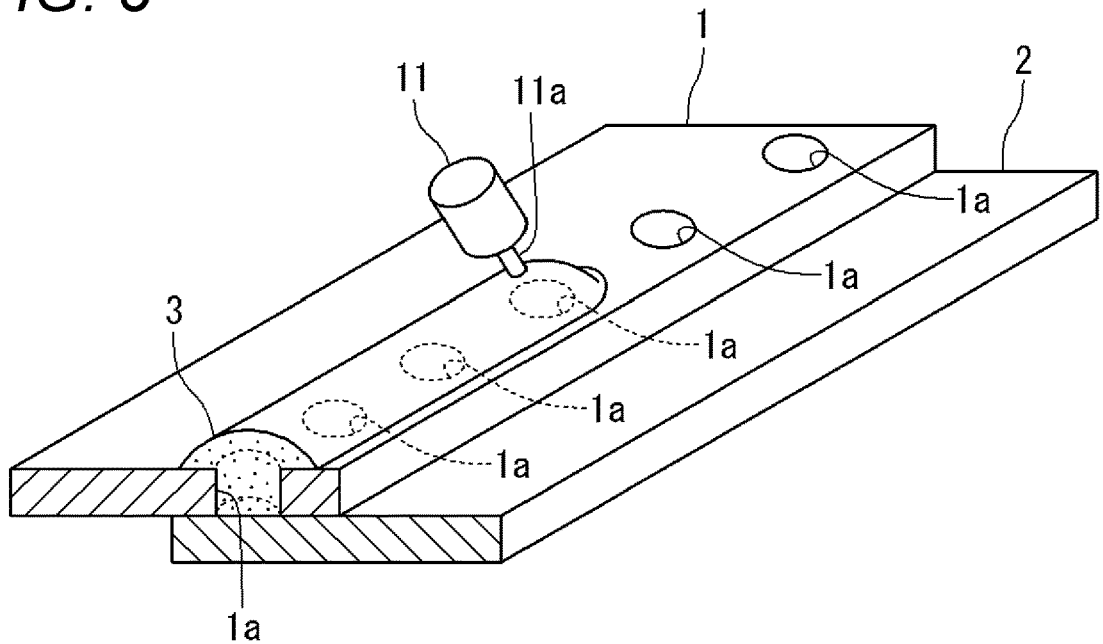
FIG. 8 is a partially sectional perspective view illustrating a welding operation of the first illustrative embodiment.

In this case, the welding is performed by arc welding, and the arc welding is performed with a welding torch 11 being positioned above the through-hole 1a for which the welding is to be performed, as shown in FIG. 8. As a result, a welding rod 11a of the welding torch 11 is melted, and a melted filler material is filled in the through-holes 1a. Herein, the welding rod 11a is composed of the aluminum-based material, and the filler material is welded to the aluminum material 2 at the portions exposed from the through-holes 1a. As shown in FIGS. 1 to 3 and 8, the welding is performed so that the filler material floods onto a surface of the steel material 1 from the through-holes 1a. The filler material flooded onto the surface of the steel material 1 is cooled and become welding beads 3 to cover the steel material 1 in the vicinity of the through-holes 1a. In this way, the aluminum material 2 is welded to the welding beads 3, and the steel material 1 is mechanically coupled to the welding beads 3. As a result, the steel material 1 and the aluminum material 2, which are different materials, are joined. The welding bead 3 is an example of the welded part of the disclosure.

Figure 6:
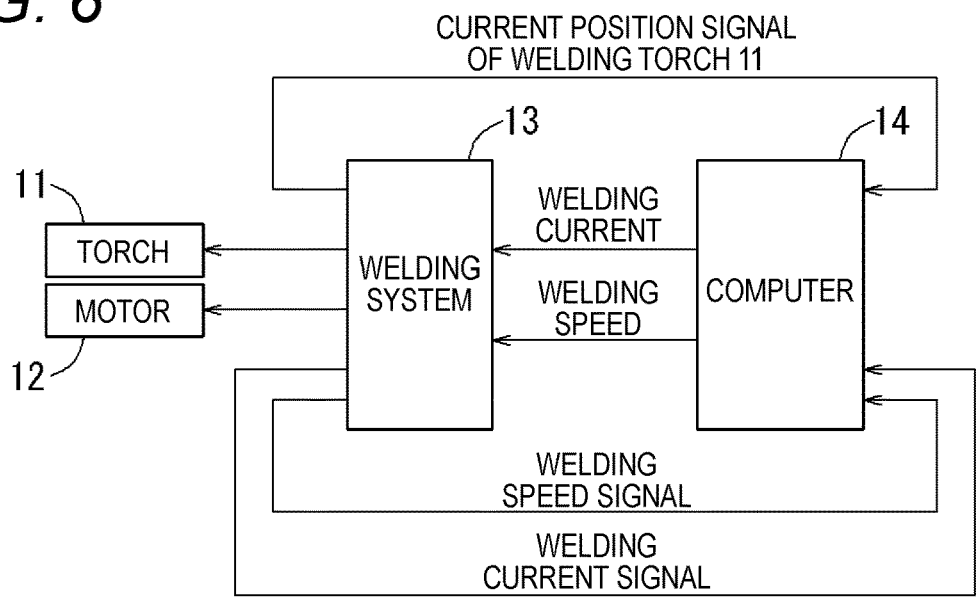
FIG. 6 is a block diagram of a welding control system of the first illustrative embodiment.

FIG. 6 depicts a control system configured to control current for the arc welding to be energized in the welding torch 11 and movement of the welding torch 11 toward each welding section. The welding torch 11 is supplied with predetermined welding current by a welding system 13, and a driving motor 12 configured to move the welding torch 11 to each welding section is also supplied with predetermined driving current by the welding system 13. The welding current and the driving current are controlled by a computer 14 connected to the welding system 13. The computer 14 is configured to input a welding current value, which is actually supplied from the welding system 13 to the welding torch 11, so as to control the welding current to preset current. Also, the computer 14 is configured to input a current position signal of the welding torch 11 from the welding system 13 so as to control a position of the welding torch 11. Also, the computer 14 is configured to input a current moving speed (welding speed) signal of the welding torch 11 from the welding system 13 so as to control a moving speed (welding speed) of the welding torch 11 during the welding.

Figure 7:
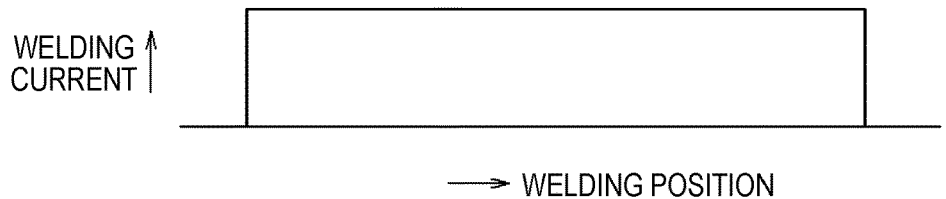
FIG. 7 is a graph depicting a change in welding current of the first illustrative embodiment.

FIG. 7 depicts the welding current that is to be supplied from the welding system 13 to the welding torch 11. The supply of the welding current starts from above the through-hole 1a of the left end of FIG. 4, which is a welding start point, and ends above the through-hole 1a of the right end of FIG. 4, which is a welding end point. During the supply, constant current is supplied to the welding torch 11. At this time, the welding speed by the driving motor 12 is also constant.

The welding is performed in this way, so that since the interval between the through-holes 1a is narrow at the welding start-side, a heat capacity per unit volume as the steel material 1 is relatively small, so that it is possible to rapidly increase a temperature of the steel material 1 after starting the welding, thereby stabilizing the welding. On the other hand, since the interval between the through-holes 1a of the respective welding sections is wider at the welding end-side than at the welding start-side, the heat capacity per unit volume of the steel material 1 is relatively large, so that it is possible to suppress the temperature increase, which is to be caused in association with the welding at each welding section. For this reason, it is possible to suppress the non-uniformity of the welding quality between the welding start-side region and the welding end-side region.

Figure 2:
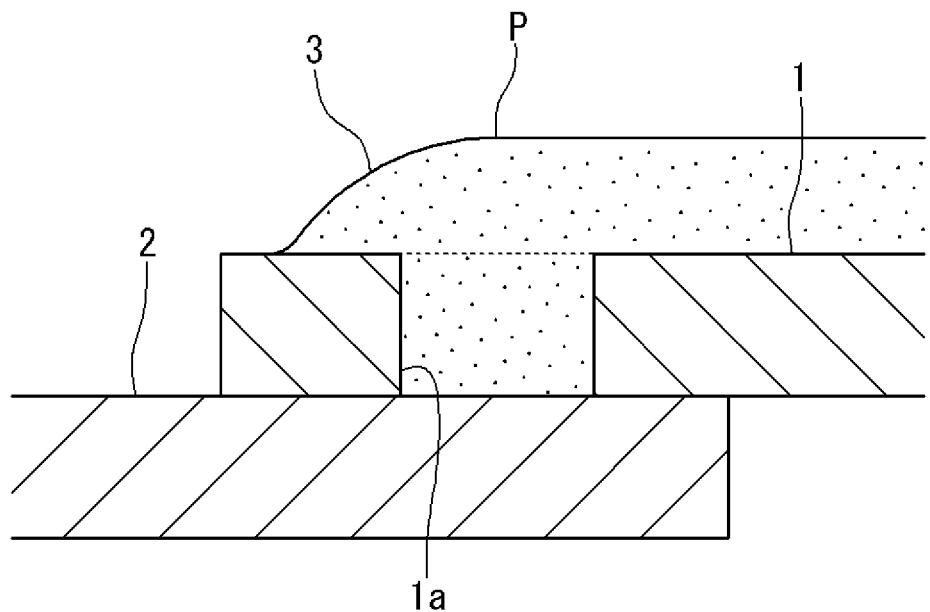
FIG. 2 is an enlarged sectional view taken along a line II-II of FIG. 1.
Figure 3:
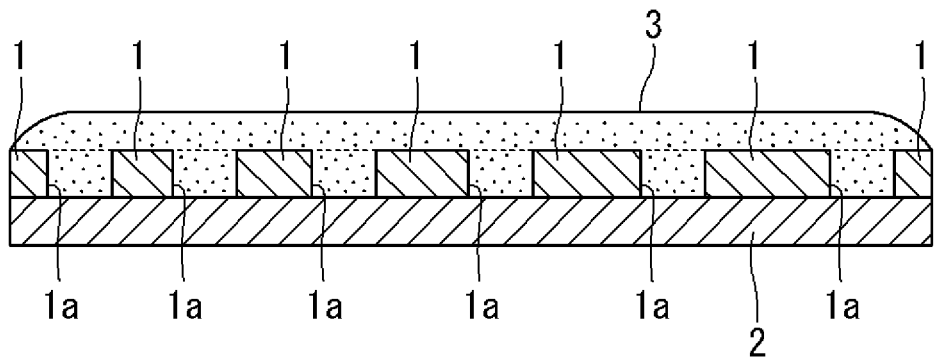
FIG. 3 is a sectional view taken along a line of FIG. 1.

Since the welding is continuously performed for each of the through-holes 1a from the welding start point to the welding end point, the welding beads 3 form a mountain range shape in which peak positions are connected, as shown in FIGS. 1 to 3.

Figure 9:
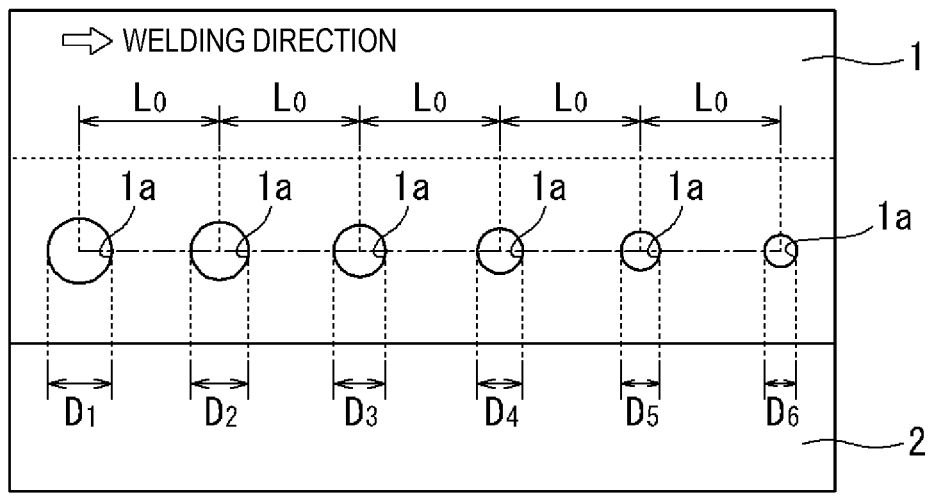
FIG. 9 is a plan view depicting an overlapped state of the steel material and the aluminum material in a second illustrative embodiment of the different material welded joint and the welding method of the disclosure.

FIG. 9 depicts a second illustrative embodiment of the disclosure. The second illustrative embodiment has features different from the first illustrative embodiment, in that an area of the through-hole 1a at each welding section is made smaller at the welding end-side than at the welding start-side with respect to the progress of the welding while the intervals between the respective through-holes 1a are made constant. The other configurations are the same as the first illustrative embodiment, and the overlapping descriptions of the same parts are omitted.

In the second illustrative embodiment, sizes of the through-holes 1a are gradually decreased from the through-hole 1a of the left end of FIG. 9, which is the welding start point, toward the right side. The respective through-holes 1a have a circular shape. The through-hole 1a of the left end of FIG. 9 has a diameter of D1, the second through-hole 1a from the left has a diameter of D2, the third through-hole 1a from the left has a diameter of D3, the fourth through-hole 1a from the left has a diameter of D4, the fifth through-hole 1a from the left has a diameter of D5, and the sixth through-hole 1a from the left has a diameter of D6. The sizes of the respective diameters are set to be D1>D2>D3>D4>D5>D6. Herein, the intervals between the respective through-holes 1a are the same and are set to L0.

According to the second illustrative embodiment, since the area of the through-hole 1a is great at the welding start-side, the heat capacity per unit volume as the steel material 1 is relatively small, so that it is possible to rapidly increase a temperature of the steel material 1 after starting the welding, thereby stabilizing the welding. On the other hand, since the sizes of the through-holes 1a of the respective welding sections are gradually decreased at the welding end-side than at the welding start-side, the heat capacity per unit volume of the steel material 1 is greater at the welding end-side, so that it is possible to suppress the temperature increase, which is to be caused in association with the welding at each welding section. For this reason, it is possible to suppress the non-uniformity of the welding quality between the welding start-side region and the welding end-side region.

Figure 10:
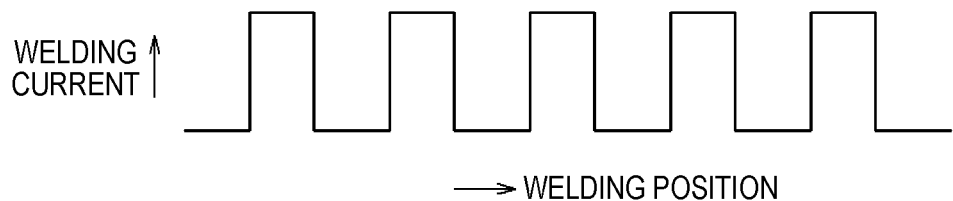
FIG. 10 is a graph depicting a change in welding current in a third illustrative embodiment of the different material welded joint and the welding method of the disclosure.

FIG. 10 depicts a third illustrative embodiment of the disclosure. The third illustrative embodiment has features different from the first illustrative embodiment, in that the welding current upon the welding, which is performed in correspondence to each through-hole 1a, forms a rectangular wave shape in which the welding current becomes discontinuous at each welding position. The other configurations are the same as the first illustrative embodiment, and the overlapping descriptions of the same parts are omitted.

In the third illustrative embodiment, when the welding torch 11 moves at constant speed along the respective through-holes 1a, the welding current controlled to have a predetermined value is supplied to the welding torch 11 while the welding torch is positioned above each of the through-holes 1a, and the welding current supplied to the welding torch 11 is zero while the welding torch is moving between the respective through-holes 1a.

The welding current is controlled in this way, so that the welding is performed only when the welding torch 11 is positioned above the through-holes 1a and the welding current is cut off while the welding torch moves between the through-holes 1a. For this reason, heat, which is to be generated in association with the welding, is suppressed by an amount corresponding to the cutoff welding current, so that an amount of heat to be accumulated in the steel material 1 and the aluminum material 2 is suppressed. That is, an increase in the amount of heat, which is to be accumulated as the welding is progressed, is suppressed. Although predetermined welding heat is generated during the welding in each of the through-holes 1a, the amount of heat accumulated before then does not increase as the welding is progressed. Therefore, an unbalance of the amounts of input heat to the welding parts at the respective welding sections is suppressed, so that it is possible to suppress non-uniformity of a welding quality between a welding start-side region and a welding end-side region.

Figure 11:
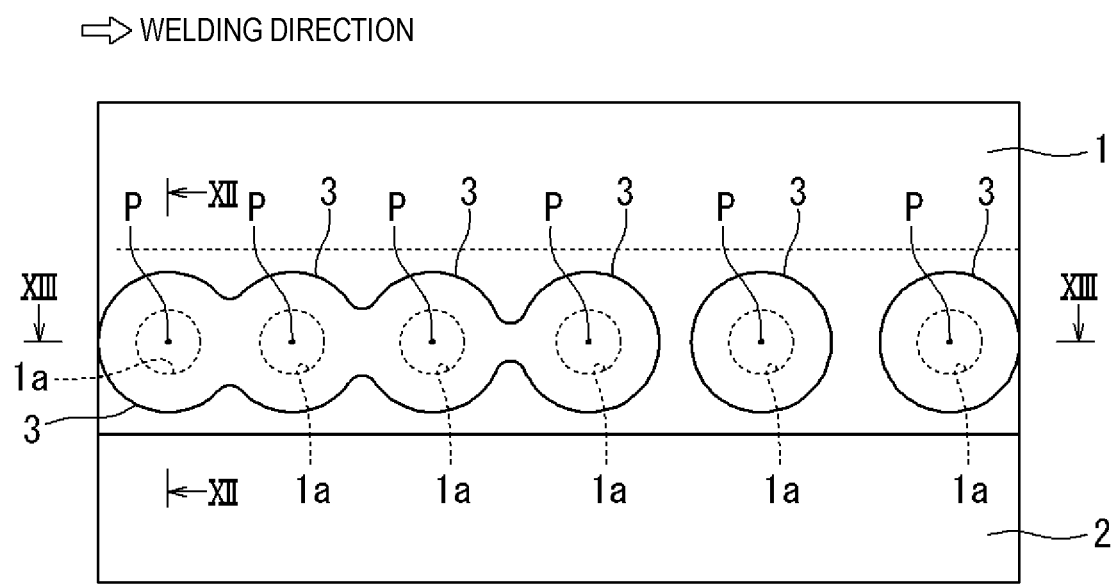
FIG. 11 is a plan view depicting the third illustrative embodiment.
Figure 12:
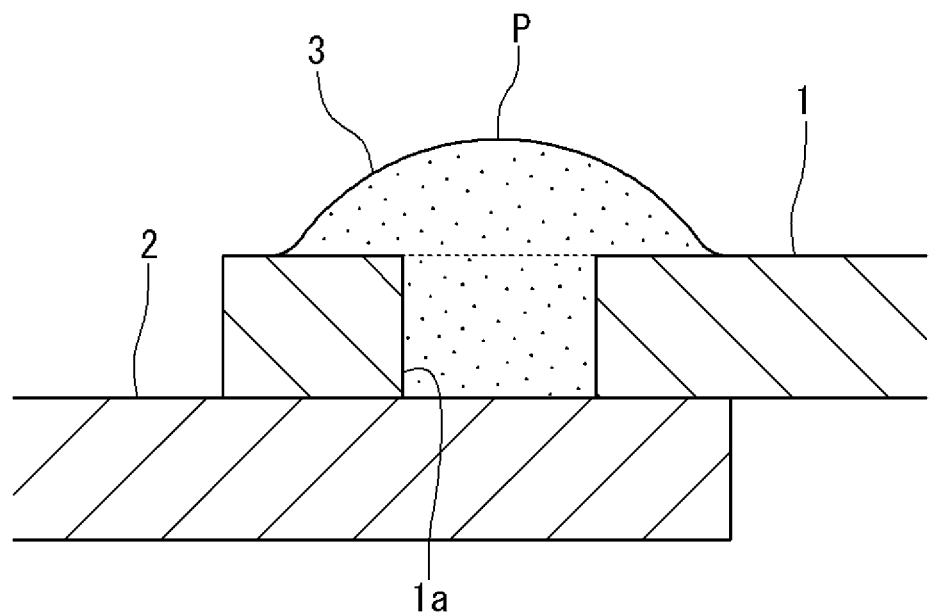
FIG. 12 is an enlarged sectional view taken along a line XII-XII of FIG. 11.
Figure 13:
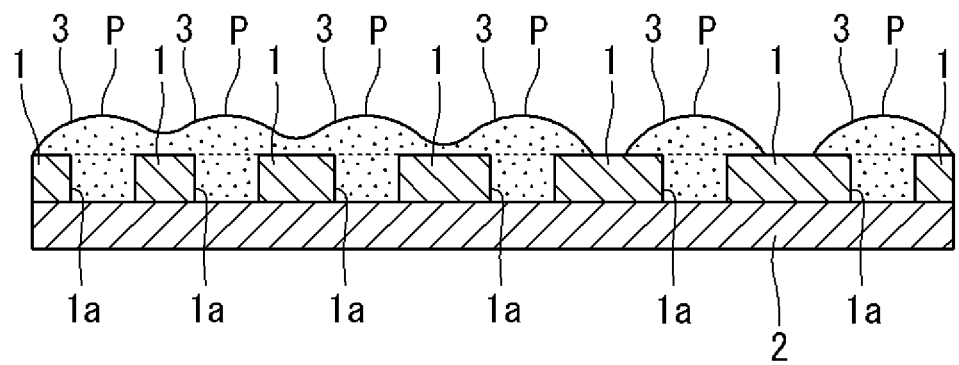
FIG. 13 is a sectional view taken along a line XIII-XIII of FIG. 11.

In this way, the welding is independently performed at each of the welding sections, instead of performing the welding in succession at the welding sections corresponding to the respective through-holes 1a, so that the welding beads 3 corresponding to the respective welding sections are formed independently of each other, as shown in FIGS. 11 to 13. That is, apexes P of thicknesses of the respective welding beads 3 from the aluminum material 2 are formed at each of the welding sections.

Figure 14:
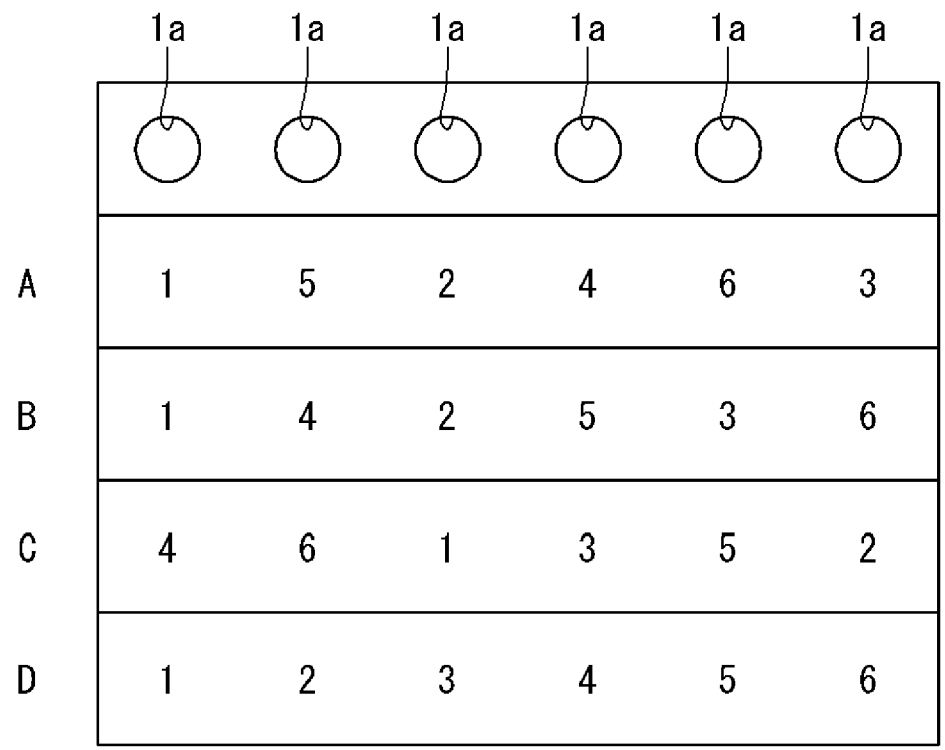
FIG. 14 illustrates a welding operation in a fourth illustrative embodiment of the different material welded joint and the welding method of the disclosure.

FIG. 14 depicts a fourth illustrative embodiment of the disclosure. The fourth illustrative embodiment has features different from the third illustrative embodiment (refer to FIG. 10), in that an order of the welding at the respective welding sections is changed. The other configurations are the same as the third illustrative embodiment, and the overlapping descriptions of the same parts are omitted.

FIG. 14 depicts a sequence of the welding that is to be performed for each of the through-holes 1a. In FIG. 14, a pattern denoted with "A" indicates a case where the welding is performed in order of outer, inner, outer, and inner sides for the plurality of through-holes 1a aligned in series. In FIG. 14, the numbers indicate the order of the welding. Therefore, in this case, the welding is first performed for the through-hole 1a of the left end of FIG. 14, which is denoted with "1", and the welding is then performed for the through-hole 1a of the center denoted with "2". Thereafter, the welding is performed in order denoted with the numbers.

In a pattern denoted with "D", which is a comparative example, the welding is sequentially performed for the plurality of through-holes 1a aligned in series from the through-hole 1a of the left end of FIG. 14 toward the through-hole 1a of the right end. The numbers indicate the order of the welding.

When performing the welding in the pattern "A", another welding section is positioned between sections at which the welding is being performed in series, so that the welding sections are spaced from each other. For this reason, an influence of the welding heat performed first time on the welding to be performed next time is suppressed, as compared to a case where the welding is performed in the pattern "D." Therefore, the unbalance of the amounts of input heat to the welding parts at the respective welding sections is suppressed, so that it is possible to suppress the non-uniformity of the welding quality between the welding start-side region and the welding end-side region.

In a pattern "B," the welding is repeatedly alternately performed for the plurality of through-holes 1a aligned in series from the through-hole 1a of the left end of FIG. 14 toward the through-hole 1a of the right end. In FIG. 14, the numbers indicate the order of the welding. Also, a pattern "C" indicates a case where the welding is performed in order of inner, outer, inner, and outer sides for the plurality of through-holes 1a aligned in series. In FIG. 14, the numbers indicate the order of the welding. Therefore, in this case, the welding is first performed for the through-hole 1a of the center of FIG. 14, which is denoted with "1", and the welding is then performed for the through-hole 1a of the right end denoted with "2". Thereafter, the welding is performed in order denoted with the numbers.

Also when the welding is performed in the patterns "B" and "C", another welding section is positioned between sections at which the welding is being performed in series, so that the welding sections are spaced from each other, like the pattern "A." For this reason, the influence of the welding heat performed first on the welding to be performed next time is suppressed, as compared to the case where the welding is performed in the pattern "D." Therefore, the unbalance of the amounts of input heat to the welding parts at the respective welding sections is suppressed, so that it is possible to suppress the non-uniformity of the welding quality between the welding start-side region and the welding end-side region.

Figure 15:
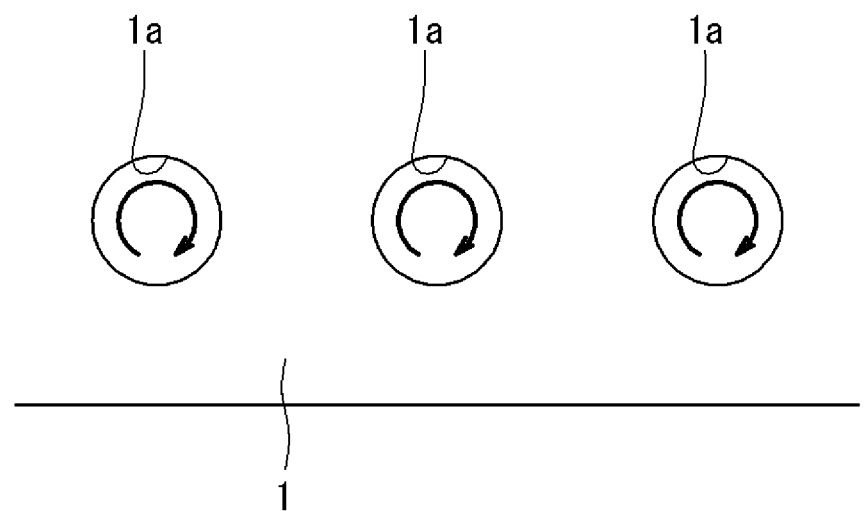
FIG. 15 illustrates a fifth illustrative embodiment of the different material welded joint and the welding method of the disclosure.

FIG. 15 depicts a fifth illustrative embodiment of the disclosure. The fifth illustrative embodiment has features different from the first illustrative embodiment, in that the welding to be performed at each of the welding sections is performed along wall surfaces of the through-holes 1a. The other configurations are the same as the first illustrative embodiment, and the overlapping descriptions of the same parts are omitted.

In the fifth illustrative embodiment, a movement trajectory of the welding rod 11a of the welding torch 11 during the welding is made to follow an inner side of the wall surface of the through-hole 1a, as shown with an arrow in FIG. 15. For this reason, the filler material associated with the welding is filled along the wall surface of the through-hole 1a and an amount of the filler material to be filled at a central portion of the through-hole 1a is suppressed, so that the thickness of the welding bead 3 is suppressed.

In order to join the steel material 1 and the aluminum material 2 by the welding, it is important that the filler material is to be welded to the aluminum material 2 and the welding beads 3 are to be covered onto the steel material 1 in the vicinity of the through-holes 1a, and it is not important that the welding beads 3 are to be formed thick in the vicinity of centers of the through-holes 1a. According to the fifth illustrative embodiment, in order to form the filler material, which is important for the joining, the welding is intensively performed along the wall surfaces of the through-holes 1a, so that it is possible to shorten welding time and to suppress the heat accumulation caused due to the welding. Therefore, the unbalance of the amounts of input heat to the welding parts at the respective welding sections, which is caused due to the influence of the heat accumulation, is suppressed, so that it is possible to suppress the non-uniformity of the welding quality between the welding start-side region and the welding end-side region.

Figure 16:
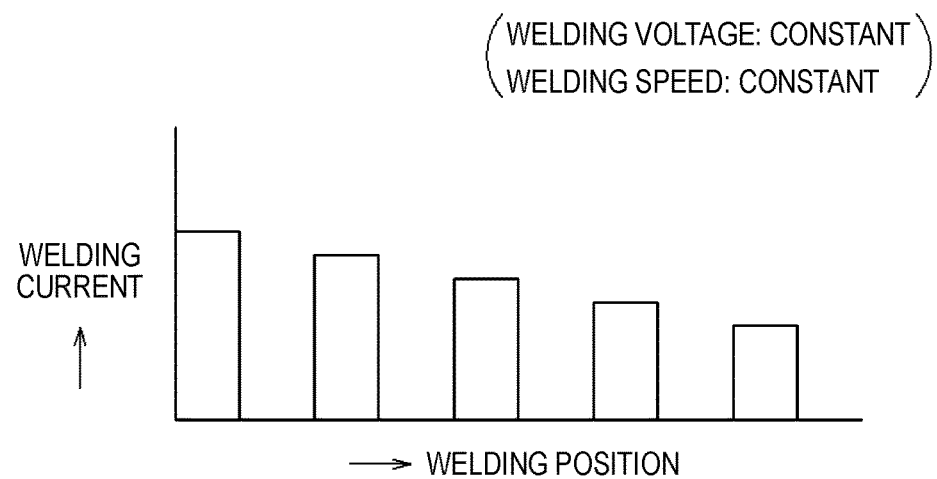
FIG. 16 is a graph depicting control map contents of the welding current in a sixth illustrative embodiment of the different material welded joint and the welding method of the disclosure.

FIG. 16 depicts a sixth illustrative embodiment of the disclosure. The sixth illustrative embodiment has features different from the third illustrative embodiment (refer to FIG. 10), in that the welding current is controlled to reduce the amount of input heat, which is newly applied as the welding is progressed, at the welding end-side as compared to the welding start-side. The other configurations are the same as the third illustrative embodiment, and the overlapping descriptions of the same parts are omitted.

In the sixth illustrative embodiment, the welding current is gradually reduced as the welding is progressed. The control of the welding current is beforehand stored with being associated with the welding position in a memory of the computer 14 as a map, as shown in FIG. 16. The computer 14 is configured to perform feedback control via the welding system 13 so that the welding current set by the map is supplied. At this time, the welding voltage and the welding speed are set constant so that they do not change as the welding is progressed.

According to the sixth illustrative embodiment, the amount of input heat, which is newly applied to each welding section, is reduced as the welding is progressed. Therefore, even when the accumulation amount of heat due to the welding is increased as the welding is progressed, it is possible to suppress the amount of input heat to the welding part at the welding section from being increased due to the influence of the heat accumulation. For this reason, the unbalance of the amounts of input heat to the welding parts at the respective welding sections is suppressed and the welding is appropriately performed at the respective welding sections, so that it is possible to suppress the non-uniformity of the welding quality between the welding start-side region and the welding end-side region.

Figure 17:
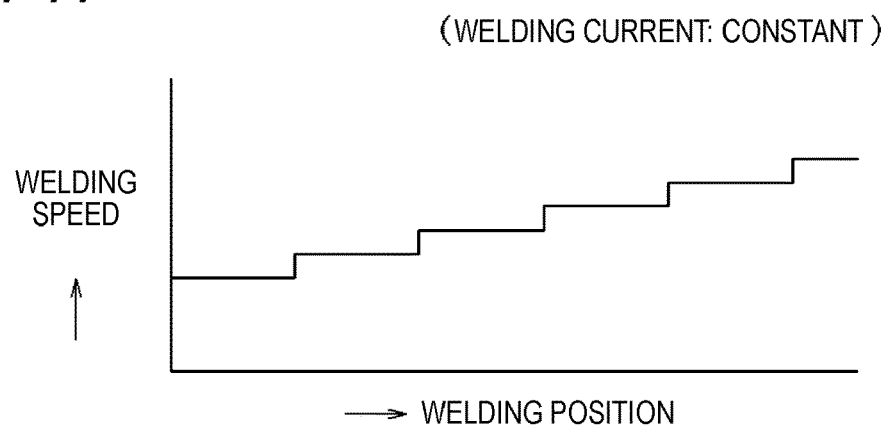
FIG. 17 is a graph depicting control map contents of welding speed in a seventh illustrative embodiment of the different material welded joint and the welding method of the disclosure.

FIG. 17 depicts a seventh illustrative embodiment of the disclosure. The seventh illustrative embodiment has features different from the first illustrative embodiment, in that the welding speed is controlled to reduce the amount of input heat, which is newly applied as the welding is progressed, at the welding end-side, as compared to the welding start-side during the welding. The other configurations are the same as the first illustrative embodiment, and the overlapping descriptions of the same parts are omitted.

In the seventh illustrative embodiment, the welding speed is gradually increased as the welding is progressed. The control of the welding speed is beforehand stored with being associated with the welding position in the memory of the computer 14 as a map, as shown in FIG. 17. The computer 14 is configured to perform feedback control via the welding system 13 so that the welding speed set by the map is made. In this case, the switching of the welding speed is performed in correspondence to each through-hole 1a. In the meantime, the welding current is set constant so that it does not change as the welding is progressed.

Also in the seventh illustrative embodiment, it is possible to achieve the same operational effects as the sixth illustrative embodiment.

Figure 18:
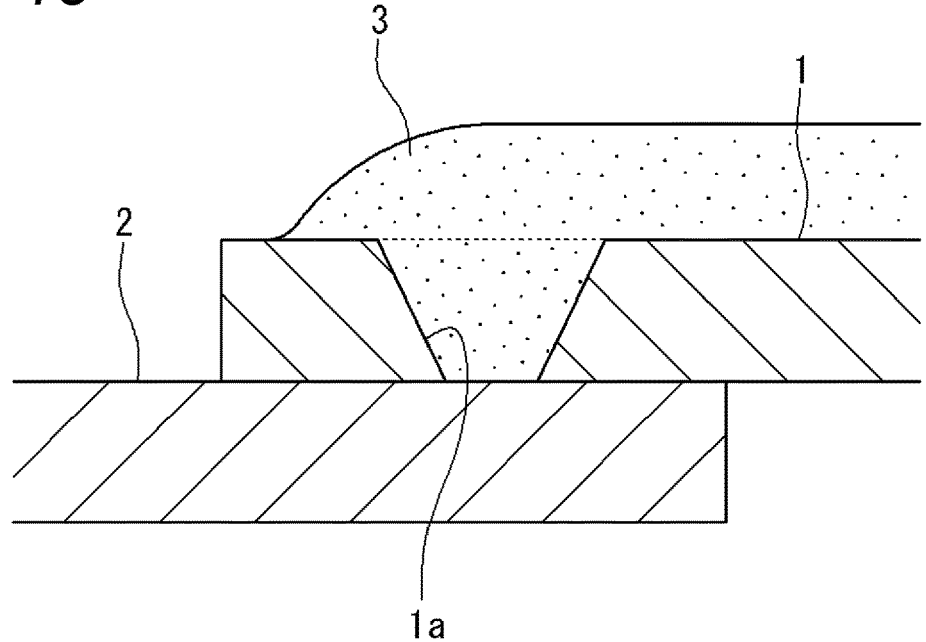
FIG. 18 is a sectional view of an eighth illustrative embodiment of the different material welded joint and the welding method of the disclosure, which is similar to FIG. 2.
Figure 19:
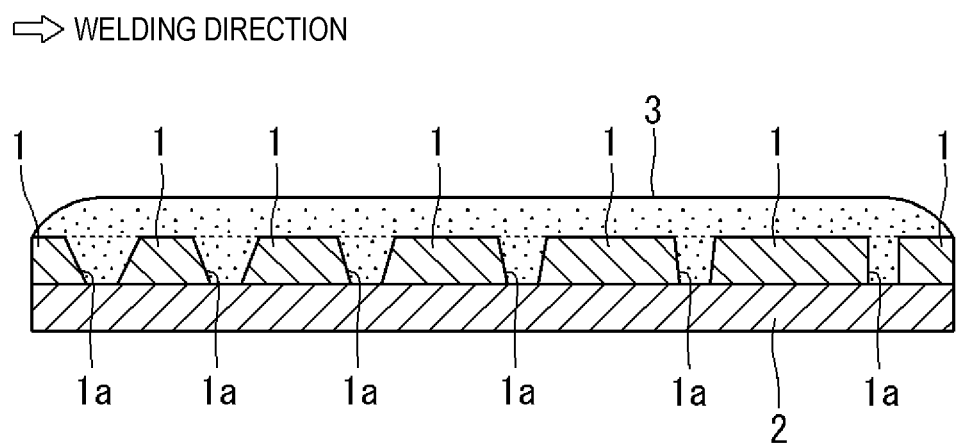
FIG. 19 is a sectional view of the eighth illustrative embodiment, which is similar to FIG. 3.

FIGS. 18 and 19 depict an eighth illustrative embodiment of the disclosure. The eighth illustrative embodiment has features different from the first illustrative embodiment, in that the wall surface, which forms the through-hole of the welding section, is more inclined at the welding start-side than at the welding end-side with respect to the progress of the welding. The other configurations are the same as the first illustrative embodiment, and the overlapping descriptions of the same parts are omitted.

In the eighth illustrative embodiment, as shown in FIG. 19, the wall surface of the through-hole 1a at the left end of FIG. 19, at which the welding starts, is largely inclined, and the wall surface of the through-hole 1a at the right end of FIG. 19, at which the welding ends, is not inclined. Also, the through-holes 1a between the through-holes 1a of both left and right ends of FIG. 19 are made so that the wall surfaces thereof are less inclined from the left toward the right.

Since the through-holes 1a are formed as described above, the amount of the filler material to be filled in the through-holes 1a is large at the welding start-side at which the welding starts and is small at the welding end-side at which the welding ends. For this reason, the amount of input heat is made to be slightly great at the welding start-side so as to stabilize the welding, and the amount of input heat to the welding part is suppressed at the welding end-side, considering the accumulation amount of heat. Thereby, it is possible to suppress the non-uniformity of the welding quality between the welding start-side region and the welding end-side region. Meanwhile, in FIGS. 18 and 19, the wall surface is inclined upward. However, the wall surface may be inclined downward. When the wall surface is inclined downward, it is possible to make a welding surface between the filler material and the aluminum material 2

(matrix) large without changing the amount of the filler material, so that it is possible to increase the joining strength between the steel material 1 and the aluminum material 2.

Although the specific illustrative embodiments have been described, the disclosure is not limited to the outward appearances and configurations thereof and can be diversely changed, added and deleted without departing from the gist of the disclosure. For example, in the above illustrative embodiments, the welding is performed by the arc welding. However, laser welding or the like may also be adopted inasmuch as it can fill the filler material in the through-holes 1a to form the welding beads 3.

The disclosure includes illustrative, non-limiting examples as follows:

(1) According to a first aspect, there is provided a different material welded joint in which a first member made of a first material and a second member made of a second material having a melting point lower than that of the first material are joined to each other by welded parts, wherein the first member has a plurality of through-holes and a filler material made of the second material is filled in the plurality of through-holes, and wherein an interval between the through-holes is made wider and/or an area of the through-hole is made smaller at a welding end-side than at a welding start-side with respect to progress of welding.

In the first aspect, the first member includes a steel material such as common steel, high-tensile steel, and the like. Also, the second member includes an aluminum material such as a pure aluminum-based material, an aluminum alloy-based material, and the like, and a magnesium material. Also, as a shape of the through-holes, a circular shape, an elliptical shape, a polygonal shape or the like may be adopted.

Also, the change in intervals between the through-holes or areas of the through-holes may be made in such a way that the intervals or areas sequentially change as the welding is progressed. Alternatively, the welding sections may be divided into a plurality of groups and the intervals or areas may be stepwise changed for each group. Also, a magnitude of the change may be appropriately set.

According to the first aspect, since the interval between the through-holes is narrow at the welding start-side, a heat capacity per unit volume as the first member is relatively small, so that it is possible to rapidly increase a temperature of the first member after starting the welding, thereby stabilizing the welding. On the other hand, since the interval between the through-holes is wider at the welding end-side than at the welding start-side, the heat capacity per unit volume of the first member is relatively large, so that it is possible to suppress the temperature increase, which is to be caused in association with the welding at each welding section. Alternatively, since the area of the through-hole is made smaller at the welding end-side than at the welding start-side and thus the heat capacity per unit volume of the first member is relatively large, the temperature increase, which is to be caused in association with the welding at each welding section, is suppressed. As a result, it is possible to suppress the non-uniformity of the welding quality between the welding start-side region and the welding end-side region.

(2) According to a second aspect, there is provided a different material welded joint according to the first aspect, wherein the first material is a steel material, and wherein the second material is an aluminum material.

In the second aspect, the steel material includes common steel, high-tensile steel, and the like. Also, the aluminum material includes a pure aluminum-based material, an aluminum alloy-based material, and the like.

According to the second aspect, since the interval between the through-holes is narrow at the welding start-side, the heat capacity per unit volume as the steel material is relatively small, so that it is possible to rapidly increase a temperature of the steel material after starting the welding, thereby stabilizing the welding. On the other hand, since the interval between the through-holes is wider at the welding end-side than at the welding start-side, the heat capacity per unit volume of the steel material is relatively large, so that it is possible to suppress the temperature increase, which is to be caused in association with the welding at each welding section. Alternatively, since the area of the through-hole is made smaller at the welding end-side than at the welding start-side and thus the heat capacity per unit volume of the steel material is relatively large, the temperature increase, which is to be caused in association with the welding at each welding section, is suppressed. As a result, it is possible to suppress the non-uniformity of the welding quality between the welding start-side region and the welding end-side region.

(3) According to a third aspect, there is provided the different material welded joint according to the first or second aspect, wherein a wall surface forming the through-hole is more inclined at the welding start-side than at the welding end-side with respect to the progress of welding.

In the third aspect, the wall surface forming the through-hole may be continuously inclined or may be inclined as a whole by forming the wall surface into a step shape. Also, a direction and an angle of the inclination may be appropriately set. Also, the inclination may be made in such a way that a degree of the inclination continuously changes from the welding start-side toward the welding end-side with respect to the progress of the welding. Alternatively, the welding sections may be divided into a plurality of groups and the inclination may be made different for each group.

According to the third aspect, the wall surface forming the through-hole is more inclined at the welding start-side than the welding end-side. Therefore, an amount of the filler material to be filled in the through-holes is large at the welding start-side and is small at the welding end-side. For this reason, the amount of input heat is made to be slightly great at the welding start-side so as to stabilize the welding, and the amount of input heat to the welding part is suppressed at the welding end-side, considering the accumulation amount of heat. Thereby, it is possible to suppress the non-uniformity of the welding quality between the welding start-side region and the welding end-side region.

(4) According to a first aspect, there is provided a welding method comprising: welding and joining a first member made of a first material and a second member made of a second material having a melting point lower than that of the first material by forming a plurality of through-holes in the first member at a plurality of welding sections at which the first member and the second member are to be welded, and filling a filler material made of the second material in the plurality of through-holes, wherein an interval between the through-holes is made wider and/or an area of the through-hole is made smaller at a welding end-side than at a welding start-side with respect to progress of welding.

In the fourth aspect, the first member includes the steel material such as common steel, high-tensile steel and the like. Also, the second member includes the aluminum material such as a pure aluminum-based material, an aluminum alloy-based material and the like, and the magnesium material. Also, as a shape of the through-holes, a circular shape, an elliptical shape, a polygonal shape or the like may be adopted.

Also, the change in intervals between the through-holes or areas of the through-holes may be made in such a way that the intervals or areas sequentially change as the welding is progressed. Alternatively, the welding sections may be divided into a plurality of groups and the intervals or areas may be stepwise changed for each group. Also, a magnitude of the change may be appropriately set.

According to the fourth aspect, since the interval between the through-holes is narrow at the welding start-side, the heat capacity per unit volume as the first member is relatively small, so that it is possible to rapidly increase a temperature of the first member after starting the welding, thereby stabilizing the welding. On the other hand, since the interval between the through-holes is wider at the welding end-side than at the welding start-side, the heat capacity per unit volume of the first member is relatively large, so that it is possible to suppress the temperature increase, which is to be caused in association with the welding at each welding section. Alternatively, since the area of the through-hole is made smaller at the welding end-side than at the welding start-side and thus the heat capacity per unit volume of the first member is relatively large, the temperature increase, which is to be caused in association with the welding at each welding section, is suppressed. As a result, it is possible to suppress the non-uniformity of the welding quality between the welding start-side region and the welding end-side region.

(5) According to a fifth aspect, there is provided a welding method according to the fourth aspect, wherein the first material is a steel material, and wherein the second material is an aluminum material.

In the fifth aspect, the steel material includes common steel, high-tensile steel, and the like. Also, the aluminum material includes a pure aluminum-based material, an aluminum alloy-based material, and the like.

According to the fifth aspect, since the interval between the through-holes is narrow at the welding start-side, the heat capacity per unit volume as the steel material is relatively small, so that it is possible to rapidly increase a temperature of the steel material after starting the welding, thereby stabilizing the welding. On the other hand, since the interval between the through-holes is wider at the welding end-side than at the welding start-side, the heat capacity per unit volume of the steel material is relatively large, so that it is possible to suppress the temperature increase, which is to be caused in association with the welding at each welding section. Alternatively, since the area of the through-hole is made smaller at the welding end-side than at the welding start-side and thus the heat capacity per unit volume of the steel material is relatively large, the temperature increase, which is to be caused in association with the welding at each welding section, is suppressed. As a result, it is possible to suppress the non-uniformity of the welding quality between the welding start-side region and the welding end-side region.

(6) According to a sixth aspect, there is provided the welding method according to the fourth or fifth aspect, wherein the welding performed at each of the plurality of welding sections corresponding to the respective through-holes is performed at a time interval so as to suppress accumulation of welding heat.

According to the sixth aspect, since there is a time interval after the welding is performed at one welding section until the welding is performed at a next welding section, the accumulation of the welding heat is suppressed. For this reason, the unbalance of the amounts of input heat to the welding parts at the respective welding sections is suppressed, so that it is possible to suppress the non-uniformity of the welding quality between the welding start-side region and the welding end-side region.

(7) According to a seventh aspect, there is provided the welding method according to any one of the fourth to sixth aspects, wherein the welding at the respective welding sections is performed along wall surfaces of the through-holes.

In order to join the first member or the steel material and the second member or the aluminum material by the welding, it is important that the filler material is to be welded to the second member or the aluminum material and the welding beads are covered onto the first member or the steel material in the vicinity of the through-holes, and it is not important that the welding beads are formed thick in the vicinity of centers of the through-holes. According to the seventh aspect, in order to form the filler material, which is important for the joining, the welding is intensively performed along the wall surfaces of the through-holes, so that it is possible to shorten welding time and to suppress the heat accumulation caused due to the welding. Therefore, the unbalance of the amounts of input heat to the welding parts at the respective welding sections, which is caused due to the influence of the heat accumulation, is suppressed, so that it is possible to suppress the non-uniformity of the welding quality between the welding start-side region and the welding end-side region.

(8) According to an eighth aspect, there is provided the welding method according to any one of the fourth to seventh aspects, wherein welding current and/or welding speed is controlled to reduce an amount of input heat, which is to be newly applied as the welding is progressed, at the welding end-side than at the welding start-side with respect to the progress of the welding.

In the eighth aspect, the control of reducing the amount of input heat can be made by reducing an amount of welding current and/or increasing a welding speed. In the meantime, the control on the welding may be open loop control or feedback control. Also, the control of reducing the amount of input heat may be continuously performed so that the amount of input heat sequentially changes as the welding is progressed. Alternatively, the welding sections may be divided into a plurality of groups, and the control may be stepwise performed so that the amount of input heat is made different for each group.

According to the eighth aspect, the amount of input heat, which is newly applied to each welding section as the welding is progressed, is reduced. Therefore, even when the accumulation amount of heat due to the welding is increased as the welding is progressed, it is possible to suppress the amount of input heat to the welding part at the welding section from being increased due to the influence of the heat accumulation. For this reason, the unbalance of the amounts of input heat to the welding parts at the respective welding sections is suppressed and the welding is appropriately performed at the welding sections, so that it is possible to suppress the non-uniformity of the welding quality between the welding start-side region and the welding end-side region.

(9) According to a ninth aspect, there is provided the welding method according to any one of the fourth to eighth aspects, wherein a wall surface forming the through-hole is more inclined at the welding start-side than at the welding end-side with respect to the progress of the welding.

According to the ninth aspect, since the wall surface forming the through-hole is more inclined at the welding start-side than at the welding end-side, the amount of the filler material to be filled in the through-holes is large at the welding start-side and is small at the welding end-side. For this reason, the amount of input heat is made to be slightly great at the welding start-side so as to stabilize the welding, and the amount of input heat to the welding part is suppressed at the welding end-side, considering the accumulation amount of heat. Thereby, it is possible to suppress the non-uniformity of the welding quality between the welding start-side region and the welding end-side region.

What is claimed is:

1. A welding method comprising: welding and joining a first member made of a first material and a second member made of a second material having a melting point lower than that of the first material by forming a plurality of through-holes in the first member at a plurality of welding sections at which the first member and the second member are to be welded, and filling a filler material made of the second material in the plurality of through-holes, wherein intervals between the through-holes are sequentially made wider at a welding end-side than at a welding start-side with respect to progress of welding and wherein each of the through-holes has the same size.

2. A welding method according to claim 1, wherein the first material is a steel material, and wherein the second material is an aluminum material.

3. The welding method according to claim 1, wherein the welding performed at each of the plurality of welding sections corresponding to the respective through-holes is performed at a time interval so as to suppress accumulation of welding heat.

4. The welding method according to claim 1, wherein the welding at the respective welding sections is performed along wall surfaces of the through-holes.

5. The welding method according to claim 1, wherein welding current and/or welding speed is controlled to reduce an amount of input heat, which is to be newly applied as the welding is progressed, at the welding end-side than at the welding start-side with respect to the progress of the welding.

6. A welding method according to claim 1, wherein the intervals between the through-holes are sequentially made wider from a welding start position at which the welding is started to a welding end position at which the welding is ended with respect to the progress of welding.

* * * * *